Feb. 27, 1951  E. A. BENDER  2,543,274
PIPE BIN AND RACK
Filed July 7, 1947  2 Sheets-Sheet 2
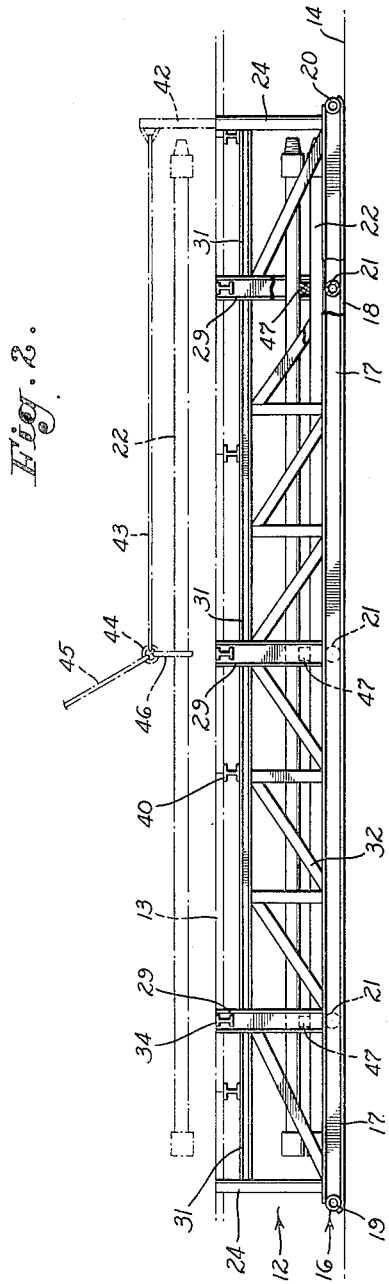
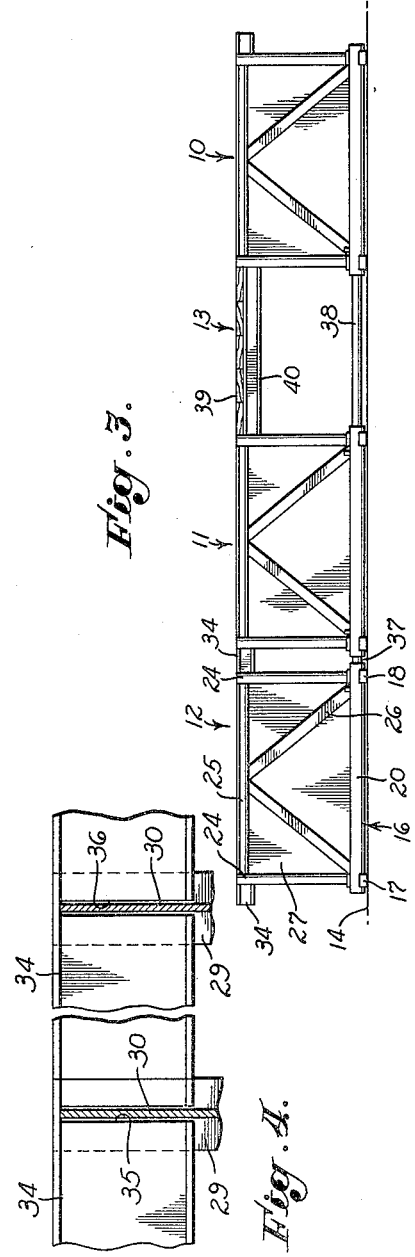
INVENTOR.
EMIL A. BENDER
BY HIS ATTORNEYS.
HARRIS, KIECH, FOSTER & HARRIS
BY

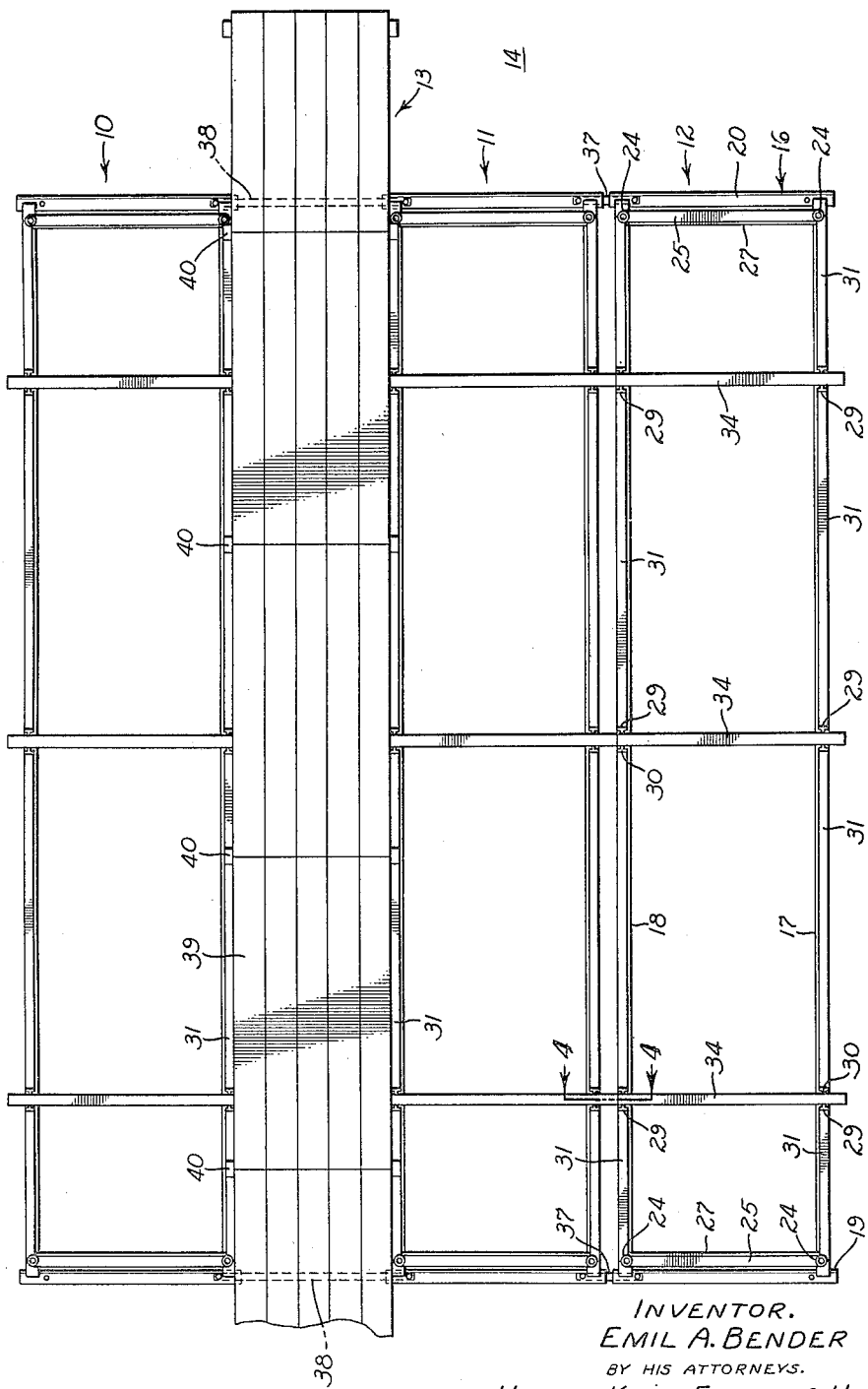

Patented Feb. 27, 1951

2,543,274

UNITED STATES PATENT OFFICE 2,543,274

PIPE BIN AND RACK

Emil A. Bender, Bakersfield, Calif.

Application July 7, 1947, Serial No. 759,403

2 Claims. (Cl. 211—60)

My invention relates to the pipe bin and rack art, and, more particularly, to a combination pipe bin and rack especially adapted for the handling and storage of relatively long, heavy sections of pipe, such as used in the oil industry. Although my invention may be put to many uses, it is susceptible of and particularly adapted to use in connection with the oil industry, and, consequently, will be described in connection therewith.

In the oil industry, relatively large quantities of heavy drill pipe are commonly employed in the drilling of wells. As such drill pipe must be frequently handled during a drilling operation, the storage of such pipe for ready access presents a serious problem. It is, therefore, a primary object of my invention to provide a pipe bin and rack which may be disposed conveniently near a drilling rig, and which is suitable for storage of drill pipe when not in use, and which, furthermore provides a method of storage of the pipe minimizing, as far as possible, the possibility of damage to the pipe when being stored, or removed for use.

As such drill pipe is normally transported from well to well, for consecutive drilling operations, special problems are presented in such transportation, due to the weight and substantial length of the sections of pipe. Many of the accidents to workmen on a drilling rig occur while they are loading or unloading drill pipe from a truck or other carrier, and it is a further object of the present invention to provide a means of transporting drill pipe which is safe and easy for the workmen to handle.

It is usual practice in the oil industry to unload drill pipe from a truck or other carrier onto a rigid frame, or pipe rack, the top of which is approximately level with the bed of the truck. The pipe is normally moved to and from the truck simply by rolling, which is hard on the truck, the rack, and the pipe and tool joints connected thereto, as well as dangerous to the workmen. The present invention completely obviates the use of such a conventional pipe rack, and its disadvantages, and greatly increases the speed of handling of the pipe, both in loading and unloading, as well as in transport.

In the conventional method of transporting drill pipe, as indicated above, the drill pipe is simply stacked on the bed of a truck. In the event that the truck is required to make a quick stop, due to the hazards of highway traffic, the free pipe on the truck bed tends to continue to move forwardly, due to its inertia, often passing entirely through the cab of the truck and killing or injuring the driver. A further object of the present invention is to obviate this danger by providing a suitable pipe bin which will contain the pipe during transport and retain it against longitudinal movement.

A further object of the invention is to provide a pipe bin adapted to contain a quantity of pipe, the bin being readily portable on a truck or other carrier as a unit with the pipe therein. Such a bin, full of drill pipe, may be quickly loaded onto or off of a truck bed by simply skidding the bin onto the ground by a winch line, instead of handling the pipe joint by joint. Also, of course, where a crane is available at the drilling rig, the bin may be loaded bodily onto or off of the truck bed, with a minimum of loading or unloading time.

A further object of the invention is to provide a pipe bin, adapted to contain drill pipe, which may be disposed relative to another similar bin so as to provide a walkway between the two bins and on a level with the tops thereof, so as to facilitate handling of the pipe in the bins. In conventional practice, such a walkway must be provided or built specially adjacent to a pipe rack of conventional type, which requires considerable labor and a substantial cost. With my invention, the supporting structure for the walkway is readily provided by the cooperation of two bins.

Still another object of the invention is to provide a pipe bin structure, which is readily portable, and which may be disposed relative to other similar pipe bin structures so as to cooperate therewith to form any desired pipe storage capacity. A further object is to provide such a pipe bin which can be readily coupled to another similar bin, or bins, to provide a unitary storage structure. Furthermore, my pipe bin is so designed that several units thereof may be stacked one on top of another in a storage yard, thus substantially conserving storage space.

Other objects and advantages of the invention will appear in the following specifications, and the drawing, which are for the purpose of illustration only, and in which:

Fig. 1 is a top plan view of the invention, showing three of my pipe bins assembled together with a walkway between two thereof;

Fig. 2 is a side elevational view of the structure shown in Fig. 1;

Fig. 3 is an end elevational view of the structure shown in Figure 2; and

Fig. 4 is an enlarged fragmentary sectional view, illustrating a detail of the invention.

Referring to the drawings, I show a first bin structure 10, a second bin structure 11, a third bin structure 12, and a walkway 13. The bin structures 10, 11, and 12 are identical in construction, and, consequently, only the bin structure 12 will be described in detail. As will be noted, the bin structures 10, 11, and 12, and the walkway 13, form a unitary storage unit which may be placed directly on the ground 14, not requiring any mat or other coverings on the ground below the same, which is another advantage of the invention.

The bin structure 12 includes a bottom frame 16, rectangular in shape, formed of a pair of parallel longitudinal bottom rails or members 17 and 18, preferably in the form of I-beams, connected at their end, as by welding or otherwise, by a pair of end rails or members 19 and 20, preferably formed of tube stock. Also interconnecting the longitudinal bottom rails 17 and 18, as best shown in Fig. 2, is a plurality of parallel tubular cross rails or lower cross members 21, welded or otherwise secured at their end to the bottom rails. The cross rails 21 provide a three point support for a lower layer of drill pipe 22, so that such bottom layer of drill pipe is supported substantially above the surface of the ground 14, which is a further advantage of the invention. By providing three or more of such cross rails 21, the weight of the drill pipe 22 is substantially distributed, minimizing the tendency of the drill pipe to bend, such bending being normally undesirable.

Secured in approximately each corner of the bottom frame 16, and welded or otherwise secured thereto, is a vertical corner post or member 24, preferably tubular in form. The upper ends of the corner posts 24 are connected by upper end rails 25, as best shown in Figs. 1 and 3, and, as shown in Fig. 3, suitable cross bracing 26 is provided between the upper and lower end rails 25 and 19 and 20 respectively. Rigidly secured, as by welding or otherwise, to the inner spaces of the upper end rails 25, the lower end rails 19 and 20, and the cross bracing 26, are metal end plates 27 which are vertically disposed and which close the ends of the bin structure 12.

Spaced along each side of the bin structure 12 is a plurality of side posts or elements 29, preferably of H-beam construction, the lower ends of which are secured, as by welding or otherwise, respectively, to the longitudinal bottom rails 17 and 18. As will be noted, the central web 30 of each of the side posts 29 is disposed parallel to the bottom rails 17 and 18. Connecting the upper portions of each series of side posts 29, and their aligned corner posts 24, is a series of aligned upper longitudinal rails 31, which may also be of I-beam construction. As illustrated in Fig. 2, the upper rails 31 are disposed a substantial distance below the tops of the corner posts 24 and the side posts 29, for a purpose to be described hereinafter. Also, as illustrated in Fig. 2, suitable cross bracing 32 is preferably disposed between the upper longitudinal rails 31, the lower longitudinal rails 17 and 18, and the side posts 29.

Adapted to span the tops of each aligned set of side posts 29 is a cross member 34, preferably in the form of an I-beam, which, as best shown in Fig. 4, is provided with slots 35 and 36 adjacent the ends thereof which are adapted to fit over the tops of the central webs 30 of the side posts 29, thus locking the side posts relative to each other, and providing a cross brace for the bin structure. The cross members 34 also serve to retain in the bin structure 12 drill pipe stacked therein. The cross members 34 are of such lengths, and the slots 35 and 36 therein are disposed, so that when a pair of bin structures, as for example the bin structures 11 and 12, are positioned adjacent to each other, the cross members 34 of each will fall into matching pairs to provide continuous rails across both bin structures, thus providing tracks across which drill pipe may be rolled if desired, or upon which drill pipe or other tools may be stored or secured.

The bin structures 10, 11, and 12, and as many additional similar bin structures as desired, may be secured together in a side by side relationship as illustrated in Fig. 1, by inserting pins 37 into aligned end rails 19 and 20 of each, or if it is desired to leave a space for the walkway 13, by longer pins 38 similarly inserted. Such pins will assist in maintaining the bin structures in fixed position relative to each other.

The walkway 13 is constructed simply of flat planking 39 suitably positioned on cross H-beams 40 which in turn are simply rested on the top of upper longitudinal rails 31 of the adjacent bin structures 10 and 11. The parts of the bin structures are so related in size and position that the top surface of the walkway 13 is preferably in the same plane as the top faces of the cross members 34, so that pipe or tubing may be rolled directly from the walkway onto the cross members.

In use, an anchor post 42 may be inserted into one of the corner posts 24 to serve as an anchor for an anchor line 43 the end of which is connected to a ring 44, the latter also having connected thereto the derrick catline 45 and a suitable sling 46. As illustrated in Fig. 2, drill pipe is stored in the bin structure 12 in layers, each layer being separated by a plurality of horizontally disposed spacers 47, which may be wood planks. The spacers 47 are preferably so designed that they may be dropped into and retained in the inner channels of the side posts 29, which retain them in place, and this is a further feature of the invention. As will be understood, the spacers 47 between adjacent layers of drill pipe prevent direct contact between the layers, preventing damage during loading, unloading, and storage. As will be apparent to those skilled in the art, the sling 46 may be suitably secured to a length of drill pipe, and by use of the catline 45, the drill pipe may be moved from the bin structure 12 to any convenient point of use. As will also be apparent from Fig. 2, the side panels of the bin structure 12, including the cross bracing 32, provide a rigid construction, and the bin structure may be placed on separate axles and pneumatic wheels if trucks and trailers are not readily available.

As will be appreciated by those skilled in the art, I have shown and described a preferred embodiment of the invention but do not intend to be limited thereto. For example, the bin structure 12 may be fabricated as an integral unit, as disclosed, or, alternatively, the side panel structures may be made as separate units to be bolted to the cross members, or completely knocked-down to facilitate shipment. Consequently, I do not intend to be limited to the specific embodiment shown, but desire to be afforded the full scope of the following claims.

I claim as my invention:

1. In a pipe bin and rack structure, the combination of: a first bin structure, including a rectangular bottom frame having connecting side rails and open-ended tubular end rails and cross rails therebetween, and four vertical corner posts each of which is connected to a corner of said frame and extends upwardly therefrom, and a pair of vertical side posts each of which is connected to said frame intermediate a pair of said corner posts; a second bin structure, including a rectangular bottom framework having connecting side members and open-ended tubular end members and cross members therebetween, and four vertical corner members each of which is connected to a corner of said framework and extends upwardly therefrom, and a pair of vertical side elements each of which is connected to said framework intermediate a pair of said corner members; and elongated rods having their ends inserted in opposed open ends of opposed end rails and end members and connecting each of said end rails to one of said end members, so that said frame and framework are disposed parallel and adjacent to each other and interconnected to form a unitary structure.

2. In a pipe bin and rack structure, the combination of: a first bin structure, including a rectangular bottom frame having connecting side rails and open-ended tubular end rails and cross rails therebetween, and four vertical corner posts each of which is connected to a corner of said frame and extends upwardly therefrom, and a pair of vertical side posts each of which is connected to said frame intermediate a pair of said corner posts; a second bin structure, including a rectangular bottom framework having connecting side members and open-ended tubular end members and cross members therebetween, and four vertical corner members each of which is connected to a corner of said framework and extends upwardly therefrom, and a pair of vertical side elements each of which is connected to said framework intermediate a pair of said corner members; elongated rods having their ends inserted in opposed open ends of opposed end rails and end members and connecting each of said end rails to one of said end members, so that said frame and framework are disposed parallel and adjacent to each other and interconnected to form a unitary structure; first means connecting the upper ends of said side posts and supported thereby; and second means connecting the upper ends of said side elements and supported thereby, said first and second means being longitudinally aligned and forming a support.

EMIL A. BENDER.

REFERENCES CITED

The following references are of record in the file of this patent:

UNITED STATES PATENTS

| Number | Name | Date |
|---|---|---|
| 1,018,637 | Shults | Feb. 27, 1912 |
| 1,209,157 | Heerdt | Dec. 19, 1916 |
| 1,296,574 | Wait | Mar. 4, 1919 |
| 1,867,611 | Borrmann | July 19, 1932 |
| 2,024,411 | Willoughby | Dec. 17, 1935 |
| 2,248,119 | Reed et al. | July 8, 1941 |
| 2,327,410 | Ferguson | Aug. 24, 1943 |
| 2,327,587 | Attwood | Aug. 24, 1943 |
| 2,368,862 | Milburn et al. | Feb. 6, 1945 |
| 2,398,153 | Nielsen | Apr. 9, 1946 |
| 2,464,109 | Woolslayer et al. | Mar. 8, 1949 |